United States Patent [19]
Lind

[11] Patent Number: 5,531,535
[45] Date of Patent: Jul. 2, 1996

[54] DOUBLE CONNECTOR FOR CONNECTING TWO BODIES

[75] Inventor: Stefan Lind, Waldachtal, Germany

[73] Assignee: fischerwerke, Artur Fischer GmbH & Co. KG, Waldachtal, Germany

[21] Appl. No.: 289,756

[22] Filed: Aug. 12, 1994

[30] Foreign Application Priority Data

Aug. 14, 1993 [DE] Germany ............... 9312195 U

[51] Int. Cl.$^6$ .................................... F16B 2/04
[52] U.S. Cl. ............. 403/297; 403/231; 403/404; 411/60; 411/55; 52/582.2; 52/250
[58] Field of Search ................... 403/381, 230, 403/231, 297, 294, 292, 282, 405.1, 406.1, 407.1, 408.1, 12, 404; 82/582.2, 587.1, 250, 704; 411/60, 61, 55, 24

[56] References Cited

U.S. PATENT DOCUMENTS

| | | | |
|---|---|---|---|
| 4,093,389 | 6/1978 | Wibrow | 403/297 X |
| 4,614,471 | 9/1986 | Mauritz | 411/60 X |
| 4,656,806 | 4/1987 | Leibhard et al. | 52/704 |
| 4,786,225 | 11/1988 | Poe et al. | 403/408.1 X |
| 4,789,284 | 12/1988 | White | 411/55 X |
| 4,865,246 | 9/1989 | Miyanaga | 411/60 X |
| 4,968,200 | 11/1990 | Mark | 411/60 X |
| 5,106,250 | 4/1992 | Fischer et al. | 411/24 X |
| 5,169,269 | 12/1992 | Tatematsu et al. | 403/297 X |
| 5,288,190 | 2/1994 | Winkeljann et al. | 411/55 |
| 5,352,077 | 10/1994 | Lind | 411/60 X |

FOREIGN PATENT DOCUMENTS

| | | |
|---|---|---|
| 1625393 | 8/1972 | Germany. |
| 3245948 | 6/1984 | Germany ................ 403/12 |
| 4005999 | 8/1991 | Germany. |
| 4002512 | 8/1991 | Germany. |
| 4014812 | 11/1991 | Germany. |

*Primary Examiner*—Kenneth J. Dorner
*Assistant Examiner*—Harry C. Kim
*Attorney, Agent, or Firm*—Michael J. Striker

[57] ABSTRACT

The double connector for connecting two bodies, especially for connecting two slabs of stone, marble or the like, consists of two anchoring elements (4,5), one in each body being connected, and a sleeve-like connecting piece (1) including two stud parts on opposite ends. The connecting piece (1) is connectable with the stud parts on the anchoring elements located in drilled holes provided in the bodies. So that the double connector, in addition to having a simple assembly, can absorb comparatively large tensile and compressive forces, at least one anchoring element (4,5) consists of an expansion element (7) received in one (13) of the drilled holes and a anchor core (6) consisting of a cone (8) and a bolt part (6') extending from the cone (8) and provided with a bolt collar (9) spaced from the cone (8). The bolt collar (9) of the bolt part (6') engages or locks in a suitable undercut (15) provided in one of the stud parts. The expansion element (7) is braced in the drilled hole (13) when the anchor core (6) connected with the stud part with the undercut is inserted onto it due to engagement of the expansion element (7) with the end face (E) of the stud part so as to secure the double connector in the drilled hole (13).

14 Claims, 1 Drawing Sheet

DOUBLE CONNECTOR FOR CONNECTING TWO BODIES

BACKGROUND OF THE INVENTION

The present invention relates to a double connector for connecting two bodies, especially for making a concealed connection between two slabs of stone, marble or the like.

A double connector of this type is known comprising a sleeve-like connecting piece with two stud parts at opposing ends of the connecting piece, which engages in drilled holes in the bodies or slabs to be connected and whose stud parts are each connected to anchoring elements fixed in the drilled holes in the bodies or slabs.

A push-in connection for slabs is described in German Patent Document DE-PS 1 625 393 which consists of two connecting elements that can be locked with each other and fixed in drilled holes, which are aligned with one another, provided in the slabs to be connected. These connecting elements are fixed by means of fixing studs, the outer surface of which are provided with a sawtooth profile. The fixing stud is pressed into the drilled hole in the slab and holds in the slab, because of the friction between the fixing stud and the wall of the drilled hole.

This type of connection between two slabs of stone or marble is no longer sufficient, at least in facade construction. For safety reasons, in facade construction, fixing elements made of steel are predominantly used which are anchored in the slabs by interlocking and/or expanding.

SUMMARY OF THE INVENTION

It is an object of the present invention to provide a double connector for connecting two bodies, especially for connecting two slabs of stone, marble or the like, which can absorb comparatively large tensile and compressive forces.

It is another object of the present invention to provide an article consisting of two bodies, particularly two slabs of stone, marble or the like, which are connected by at least one double connector according to the invention, to provide a structure which can absorb comparatively large tensile and compressive forces.

According to the invention the double connector for connecting two bodies, especially for concealed connection of two marble or stone slabs, consists of a sleeve-like connecting piece and two anchoring elements. The sleeve-like connecting piece includes a stud part at each of the opposite ends of the sleeve-like connecting piece so that the connecting piece is connectable with the stud parts on anchoring elements in drilled holes in the bodies to be connected.

To provide improved anchoring which can bear comparatively large tensile and compressive forces at least one anchoring element consists of an anchor core and an expansion element placed in one of the drilled holes in the bodies The anchor core advantageously includes an expansion cone and a bolt part or shaft provided with a bolt collar. At least one stud part has an end face and an undercut into which the bolt collar of the bolt part can lock or engage so that the expansion element is braced in the drilled hole due to engagement of the expansion element with the end face of the at least one stud part when the anchor core is inserted into the drilled hole.

To make the connection of the two bodies, one stud part of the connecting piece is anchored, with the anchoring element associated with this stud part, in the undercut drilled hole of a slab. Anchoring is effected by pressing an expansion element, which is preferably formed like a wave-shaped ring and is on the expansion cone provided on the anchor core so that the expansion element is braced in the undercut of the drilled hole. Onto the other, projecting stud part, into which another anchor core is loosely placed with another expansion element thereon, the second slab, which likewise has a suitable drilled hole, is now pressed. As soon as the other anchor core member sits with its end face on the bottom of the drilled hole of the second slab, the bolt or shank provided with a bolt collar is pushed into the other stud part and at the same time the expansion element is braced between the end face of the other stud part and the expansion cone. By the locking of the bolt collar arranged on the other anchor core into the undercut of the stud part, both the anchoring of the stud part in the second slab and also the connection of the two slabs are achieved. By anchoring the double connector by expansion elements in the two slabs, and because of the locking connection between the anchor core and the stud parts, a stable and high strength connection of the two slabs is obtained.

The expansion element can be braced in the undercut of the drilled hole without any great expenditure of force. Little or no expansion pressure forces therefore occur, which makes possible an anchoring which is non-damaging but, because of the interlocking, produces high retaining forces.

If a visible joint is to remain between the two slabs to be connected to each other, a stop collar can be provided on the connecting piece between the two stud parts for that purpose.

In another embodiment of the invention the stud part to be anchored first may be provided with a central bore having an internal thread and can be secured to the anchor core via a suitable external thread on the bolt part of anchor core. In this embodiment the outside diameter of the stud part should be matched to the diameter of the drilled hole and for the stop collar to be provided with flats or flat surfaces for the engagement with a spanner.

The invention also includes two bodies connected by at least one of the above-described double connectors according to the invention. This article has particular advantages when it consists of two slabs of stone, marble or the like connected by at least one of the above-described double connectors.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
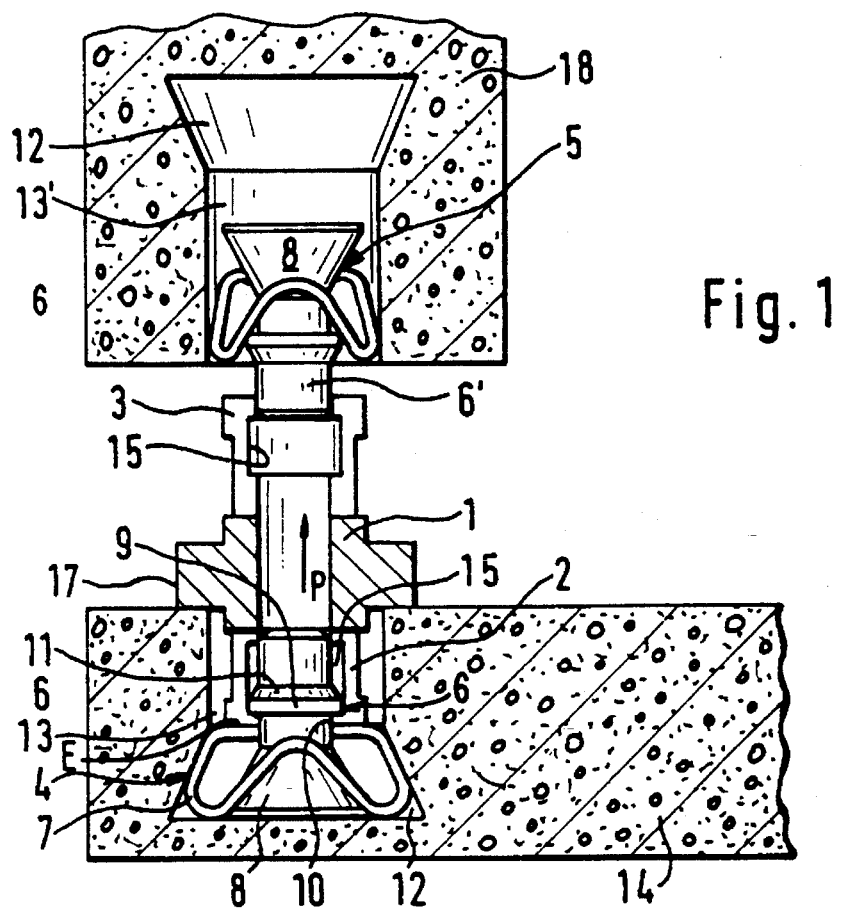
FIG. 1 is a cross-sectional view of one embodiment of a double connector according to the invention already anchored in one slab.

The embodiment of the double connector shown in FIG. 1 consists of a sleeve-like connecting piece 1 and the two anchoring elements 4, 5, which are of identical construction. The sleeve-like connecting piece 1 includes two stud parts 2,3 on opposite ends thereof and a stop collar 17 between the stud parts 2,3 for engagement with two slabs 14, 18 which the connector acts to connect. Each anchoring element 4,5 in this embodiment consists of a anchor core 6 and expansion element 7, which is in the shape of a wave-shaped ring.

The anchor core 6 consists of an expansion cone 8 and a bolt part 6' or shaft extending from the expansion cone 8. The bolt part 6' is provided with a circumferential collar 9 spaced from the expansion cone 8. The anchor core 6 is inserted in a direction P into an internal bore 10 of the stud part 2 during assembly of the double connector. To facilitate insertion of the anchor core 6 into the stud part 2 the collar 9 is provided with a chamfer 11 which tapers toward the bolt part 6' in the insertion direction P. When the anchor core 6 is inserted into the internal bore 10 of the stud part 2, the expansion element 7, which is engaged by the expansion cone 8 of the anchor core 6, is braced in the undercut 12 of the drilled hole 13 of the slab 14, so that the anchor core 6 is anchored in the slab 14. At the same time, the bolt collar 9 locks into the undercut 15 of the stud part 2, and forms a tension-resistant connection between the anchoring element 4 and the stud part 2. In order to be resilient, the two stud parts 2, 3 are provided with a plurality of slots 16 starting from their end face E.

After the anchoring element 4 has been fixed in the slab 14 as shown in FIG. 1, the stop collar 17 sits on an outer surface of the slab 14. To connect the slab 18 to the slab 14, the anchoring element 5 is pressed into the drilled hole 13' in the slab 18 by pushing the slab 14 with the anchoring element toward the slab 18. The slab 18 has a drilled hole identical to the drilled hole 13 of the slab 14. When the slab 18 is pushed against the slab 14, the anchor core 6 of the anchoring element 5 is forced into the stud part 3 with the bolt collar 9 locked in the undercut 15. The anchoring element 5 is thereby anchored in the drilled hole 13' of the slab 18.

Figure 2:
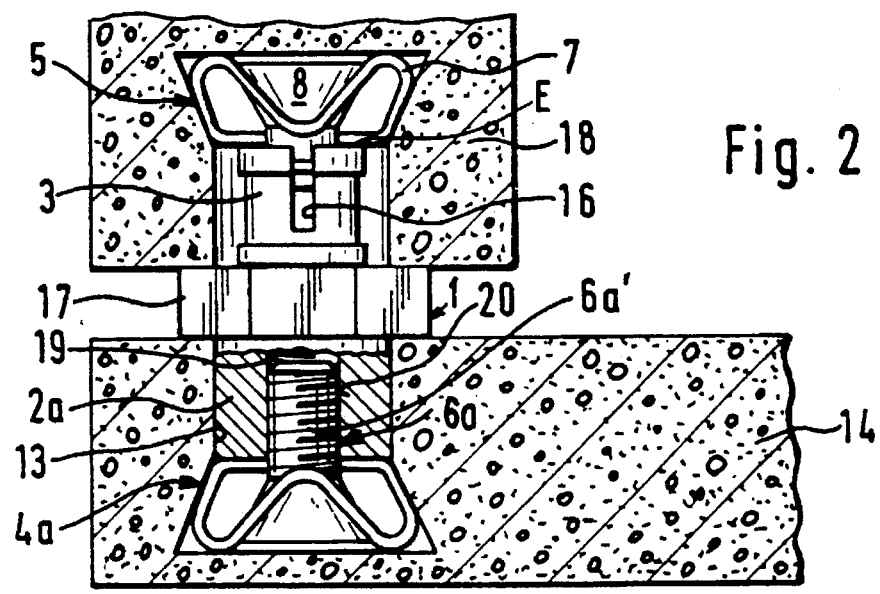
FIG. 2 is a cross-sectional view of another embodiment of a double connector according to the invention provided with two different anchoring elements and anchored in two slabs connecting them.

As can be seen in the embodiment shown in FIG. 2, the slab 18, after anchoring, sits on the stop collar 17. In the embodiment of FIG. 2 the anchoring element 4a is different from the anchoring element 4 of FIG. 1, but the anchoring element 5 is the same as the anchoring element 5 of FIG. 1 and the same reference numbers are used to designate the same parts. The connecting piece 1 includes the stud part 2a and the stud part 3, which is identical to the stud parts shown in FIG. 1. However the stud part 2a is not slotted and is provided with a central bore and an internal thread 19. The fixing of the anchoring element 4a in this exemplary embodiment is effected by rotating the stud part 2a onto the anchor core 6a, which for this purpose has a suitable external thread 20 on bolt part 6a'. The stud part 2a is screwed on before the fixing of the slab 18 on the opposed anchoring element 5. In this embodiment, the stud part 2a may have an outside diameter corresponding to the drilled hole 13. In order to allow a spanner to be fitted on, in this alternative embodiment the stop collar 17 is polygonal, i.e. has a polygonal transverse cross-section.

While the invention has been illustrated and described as embodied in a double connector for connecting two bodies, especially for making a concealed connection between two slabs of stone, marble or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A double connector for connecting two bodies, said double connector consisting of a sleeve-like connecting piece (1) and two anchoring elements (4,5);

wherein said sleeve-like connecting piece (1) has opposite ends and includes a stud part (2,3) at each of said opposite ends;

wherein at least one (5) of the two anchoring elements (4, 5) consists of an expansion element (7) and an anchor core (6) including a bolt part (6') provided with a bolt collar (9); and wherein at least one (2) of the stud parts (2,3) has an end face (E) for engaging said expansion element (7) and an undercut (15) into which said bolt collar (9) of said bolt part (6') is insertable to secure the at least one (2) of the stud parts and the at least one (5) of the two anchoring elements together as said expansion element (7) is expanded by said end face (E).

2. The double connector according to claim 1, wherein the anchor core (6) includes an expansion cone (8) extending from the bolt part (6'), said expansion element (7) is in the form of a wave-shaped ring engaged on the expansion cone (8) of the anchor core (6).

3. The double connector according to claim 1, wherein the bolt collar (9) provided on the bolt part (6') is provided with a chamfer (11) inwardly tapering toward the bolt part (6') in an insertion direction (P) of the anchor core (6) into the at least one (2) of the stud parts.

4. The double connector according to claim 1, wherein another (2a) of the stud parts of the sleeve-like connecting piece (1) is provided with an internal thread (19) and another (4a) of the anchoring elements includes another anchor core including another bolt part (6a') provided with an external thread (20) in which said internal thread (19) is engageable so that the other anchor core (6') can be screwed in the other stud part (2a).

5. The double connector according to claim 4, wherein the sleeve-like connecting piece (1) includes a polygonal stop collar (17) between the stud parts.

6. The double connector according to claim 1, wherein said at least one (2) of the stud parts provided with said end face (E) has at least one slot (16) in said end face (E) so that said at least one (2) of the stud parts is expandable during insertion of said bolt part (6') in said at least one (2) of the stud parts.

7. Two bodies and connection means for connecting the two bodies, said connection means comprising a double connector consisting of a sleeve-like connecting piece (1) having opposite ends and two anchoring elements (4,5);

wherein said sleeve-like connecting piece (1) includes a stud part (2) at each of said opposite ends;

wherein at least one (5) of the anchoring elements (4, 5) consists of an expansion element (7) and an anchor core (6) including a bolt part (6') provided with a bolt collar (9);

wherein at least one (2) of the stud parts (2,3) has an end face (E) for engaging said expansion element (7) and a stud part undercut (15) into which said bolt collar (9) of said bolt part (6') is insertable to secure the at least one (2) of the stud parts and the at least one (5) of the anchoring elements together as said expansion element (7) is expanded by said end face (E); and wherein at least one of said two bodies is provided with a drilled hole having a drilled hole undercut (12), said at least one (5) of the anchoring elements with said expansion element (7) is inserted in said drilled hole having the drilled hole undercut (12) so that said expansion element (7) is in said drilled hole undercut (12), and said bolt collar (9) is inserted in said stud part undercut (15) so that said at least one (5) of the anchoring elements is secured in said at least one (2) of the stud parts with said expansion element (7) braced in said drilled hole.

8. The two bodies and connection means according to claim 7, wherein each of said two bodies is a stone slab.

9. The two bodies and connection means according to claim 7, wherein each of said two bodies is a marble slab.

10. The two bodies and connection means according to claim 7, wherein the anchor core (6) includes an expansion cone (8) extending from the bolt part (6'), said expansion element (7) is in the form of a wave-shaped ring engaged on the expansion cone (8) of the anchor core (6).

11. The two bodies and connection means according to claim 7, wherein the bolt collar (9) provided on the bolt part (6') is provided with a chamfer (11) inwardly tapering toward the bolt part (6') in an insertion direction (P) of the anchor core (6) into the at least one (2) of the stud parts.

12. The two bodies and connection means according to claim 7, wherein another (2a) of the stud parts of the sleeve-like connecting piece (1) is provided with an internal thread (19) and another (4a) of the anchoring elements includes another anchor core (6') including another bolt part (6a') provided with an external thread (20) in which said internal thread (19) is engageable so that the other anchor core (6') can be screwed in the other stud part (2a).

13. The two bodies and connection means according to claim 7, wherein said at least one (2) of the stud parts has at least one slot (16) in said end face (E) so that said at least one (2) of the stud parts is expandable during insertion of said bolt part (6') in said at least one (2) of the stud parts.

14. The two bodies and connection means according to claim 7, wherein the sleeve-like connecting piece (1) includes a polygonal stop collar (17) between the stud parts.

* * * * *